United States Patent [19]
Underwood et al.

[11] Patent Number: 5,496,215
[45] Date of Patent: Mar. 5, 1996

[54] UNLOADING SYSTEM FOR A COMBINE

[75] Inventors: Mark R. Underwood, Burr Oak, Kans.; Alan Van Nahmen, Columbus, Ind.

[73] Assignee: Deere & Company, Moline, Ill.

[21] Appl. No.: 299,556

[22] Filed: Sep. 1, 1994

[51] Int. Cl.[6] .................................................. A01F 12/46
[52] U.S. Cl. ................................. 460/114; 460/119
[58] Field of Search ............................... 460/119, 114, 460/115, 149, 150

[56] References Cited

U.S. PATENT DOCUMENTS

| | | | |
|---|---|---|---|
| 3,404,686 | 10/1968 | Johnson et al. | |
| 4,060,960 | 12/1977 | Hengen et al. | 56/14.6 |
| 4,317,326 | 3/1982 | Risdinger | 460/119 X |
| 4,428,182 | 1/1984 | Allen et al. | 56/14.6 |
| 4,492,237 | 1/1985 | Pakosh | 56/14.6 |
| 4,572,215 | 2/1986 | Pakosh | 56/14.6 |
| 4,907,402 | 3/1990 | Pakosh | 56/14.6 |
| 4,928,460 | 5/1990 | Bruer et al. | 56/14.6 |
| 5,029,436 | 7/1991 | Fredriksen et al. | 460/119 X |

Primary Examiner—Terry Lee Melius
Attorney, Agent, or Firm—Grady K. Bergen; James Bradley

[57] ABSTRACT

A grain storage unit for a combine is provided having a grain bin which has a lower section which is divided into two compartment by means of a partition. The partition has sloped surfaces to facilitate the flow of grain to the intakes of two conveyor systems. The conveyor systems include a discharge conveyor and an auxiliary conveyor. The discharge conveyor is provided with plurality of paddles joined to a flexible linkage which is continuously moved throughout the interior of a discharge conveyor housing. Grain from one of the compartments of the grain bin is collected through an intake of the discharge conveyor housing and is delivered upwards and away from the combine through a discharge located at the end of the discharge conveyor housing opposite the intake. The auxiliary conveyor has an inlet located within the other of the two compartments for removing grain therefrom. The auxiliary conveyor has a conveyor housing which opens into the housing of the discharge conveyor. Grain is removed from the other of the two compartments by the operation of the auxiliary conveyor which delivers the grain to the discharge conveyor so that the efficiency of the discharge conveyor is improved.

16 Claims, 3 Drawing Sheets

UNLOADING SYSTEM FOR A COMBINE

BACKGROUND OF THE INVENTION

1. Field of the Invention

This invention relates to agricultural equipment and in particular to a grain storage means for storing grain.

2. Description of the Prior Art

Prior art methods of unloading grain from the grain bin of a combine, or similar piece of agricultural equipment, usually involve providing an unloading chute with the grain bin. The unloading chute usually has an intake located at or near the bottom of the grain bin so that grain is continuously removed even as the level of grain drops within the grain bin. A screw-type grain auger is typically used and housed within the unloading chute for conveying the grain up and away from the grain bin. These grain augers typically require very high forces and energy to elevate the grain, making their use very inefficient. The augers also tend to crack and damage the grain and are typically very hard to clean.

An improved unloader for a combine is described in U.S. patent application Ser. No. 08/080,291, U.S. Pat. No. 5,380,247, and is herein incorporated by reference. This combine is comprised of an unloader comprised of a conveyor housing having a plurality of paddles mounted within the housing which are joined to a flexible linkage. The flexible linkage is driven around a series of pulleys or sprockets so that the paddles are continuously passed through the conveyor housing. The grain bin is pivotally mounted to the frame of the combine in this embodiment so that the grain bin can be tilted, thus facilitating the flow of grain towards the intake of the unloader. The use of paddles in this unloader requires less energy so that more grain can be removed with less power input and results in less damage to the grain which is unloaded.

While the storage bin and unloader described in U.S. patent application No. 08/080,291 is a vast improvement over other prior art storage means, there is still room for new designs and improvements.

SUMMARY OF THE INVENTION

A combine for harvesting crop is provided having a frame mounted on wheels. The combine is provided with an improved storage unit for storing grain which is harvested. The storage unit has a grain bin which is mounted to the frame of the combine. A lower portion of the grain bin is provided with a partition which divides the lower portion into two compartments. A discharge conveyor is mounted to the frame of the combine and includes a discharge conveyor housing having an interior. An intake located at one end of the discharge conveyor housing locates within one of the two compartments for receiving grain located therein. The discharge conveyor housing has a discharge opening located remote from the intake for discharging grain away from the grain bin. Mounted within the interior of the discharge conveyor housing are a plurality of discharge conveyor paddles. They are spaced apart from each other at intervals and mounted within the discharge conveyor housing. Drive means consists of a flexible linkage which is rotatably driven around sprockets or pulleys in order to cause the discharge conveyor paddles to pass through the interior of the discharge conveyor housing.

An auxiliary conveyor having an auxiliary housing is also mounted to the frame of the combine. The auxiliary conveyor housing has an interior and an inlet which is in communication with the other of the two compartments of the grain bin. The auxiliary conveyor housing has a grain outlet opposite the inlet which is in communication with the interior of the discharge conveyor housing for delivering grain from the other of the two compartments into the discharge conveyor. Similarly, a plurality of auxiliary conveyor paddles are mounted within the auxiliary conveyor housing and are spaced apart at intervals. Drive means, also consisting of a flexible linkage mounted around rotatably driven sprockets, is provided for moving the auxiliary paddles through the interior of the auxiliary conveyor housing. This forces grain from the inlet of the auxiliary conveyor housing to the grain outlet where it is delivered to the interior of the discharge conveyor housing. The discharge conveyor paddles, driven by the flexible linkage, move past the intake of the discharge conveyor housing and the grain outlet of the auxiliary conveyor housing. This causes grain received from the intake of the discharge conveyor and the outlet of the auxiliary conveyor to be carried through the discharge conveyor housing and discharged through the discharge opening so that the grain is unloaded from the grain bin.

DETAILED DESCRIPTION OF THE INVENTION

Figure 1:
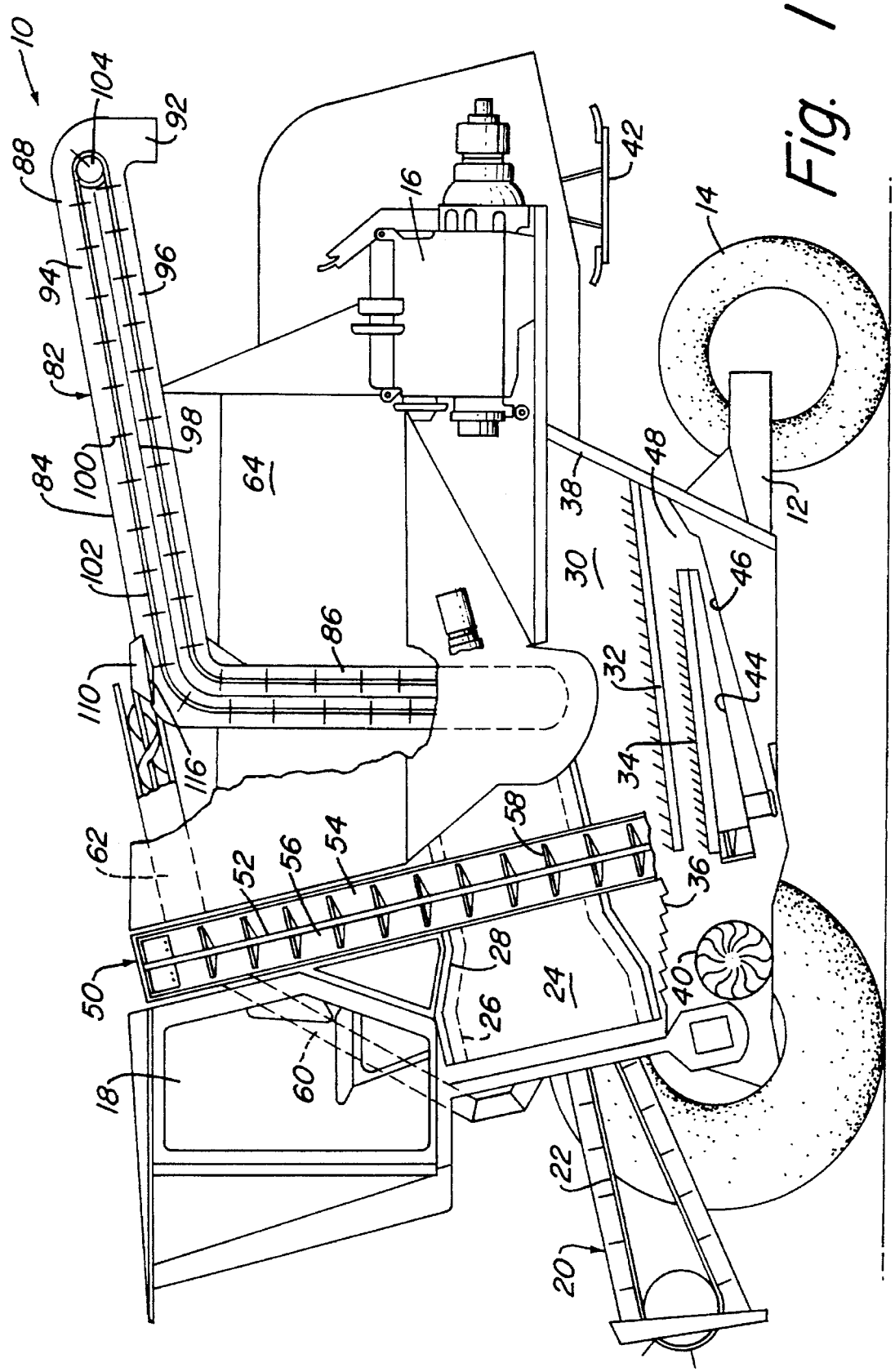
FIG. 1 is a side view of a combine, which is partially sectioned to show internal components of the combine, constructed in accordance with the invention.

A combine 10 having a frame 12 is mounted on wheels 14 and shown in FIG. 1. The combine 10 is provided with an engine 16 for powering equipment and driving the combine 10. A cab 18 located in the forward portion of the combine 10 allows an operator to control and drive the combine 10.

Located at the forward end of the combine 10 is a header assembly 20. The header assembly 20 is typically provided with a reel and reciprocating blade or cutting element (not shown) for cutting crop. An auger (not shown) delivers the crop to the center of the header assembly 20 where it is conveyed upwards on a feed belt or conveyor 22. The cut crop from the feed belt 22 is introduced into the forward end of a threshing assembly 24. The threshing assembly 24 consists of a threshing rotor 26 housed within a threshing drum 28. The threshing rotor 26 rotates within the threshing drum 28 where rasp bars (not shown) located on the exterior of the threshing rotor 26 agitate the cut crop and force grain through apertures located in the threshing drum 28.

A sieve section 30 is located below the threshing assembly 24. The sieve section consists of an upper sieve 32 and a lower sieve 34. Sieves 32, 34 are flat plates or trays having a number of small apertures through which grain can fall. A grain pan 36 located below the forward end of the threshing assembly 24 directs grain from the threshing drum 28 and directs it on to the sieves 32, 34. The sieves 32, 34 are mounted within a sieve housing 38 and may be shaken or reciprocated by shaker means (not shown) in order to facilitate passing of clean grain through the apertures of the sieves 32, 34. A fan or blower 40 located forward of the sieves 32, 34 blows air upward and rearward through the sieves 32, 34 and through an opening or window in the rearward portion of the sieve housing 38. Chaff and other lightweight crop residue are thus blown rearward to a chaff spreader 42 located at the rearward end of the combine 10 for spreading crop residue behind the combine 10. Located below the lower sieve 34 is a grain floor 44 which is sloped downward from the rearward end of the lower sieve 34 to the forward end. The grain floor 44 extends across the sieve housing 38 on either side of the combine 10.

A tailings or grain returns floor 46 extends below the upper and lower sieves 32, 34 and below the grain floor 44. The returns floor 46 slopes downward from the rear of the sieve housing 38. An open portion or opening 48 between the rear of the sieve housing 38 and the rear of the sieves 32, 34 and grain floor 44 allows grain returns to fall from the rear of the sieves 32, 34 to the returns floor 46.

A conveyor 50, constructed similarly to that described in U.S. patent application No. 08/080,291, is provided with the combine 10. The conveyor 50 has a partition 52 which divides the interior of the conveyor 50 into a grain returns compartment 54 and a clean grain compartment 56. Mounted within the conveyor 50 are a plurality of paddles or buckets 58 which force grain upwards through the clean grain compartment 56 and grain returns compartment 54. Grain returns are received from the grain returns floor 46 through an opening located in the lower portion of the conveyor 50 into the grain returns compartment 54. Similarly, clean grain from the grain floor 44 is received into the clean grain compartment 56 through an opening similarly located. The conveyor 50 elevates the clean grain where it is delivered to an auger 62 which conveys the clean grain to a grain bin 64. Grain returns from the grain returns compartment 54 is elevated and is returned to the threshing assembly 24 by means of a returns chute 60.

Figure 2:
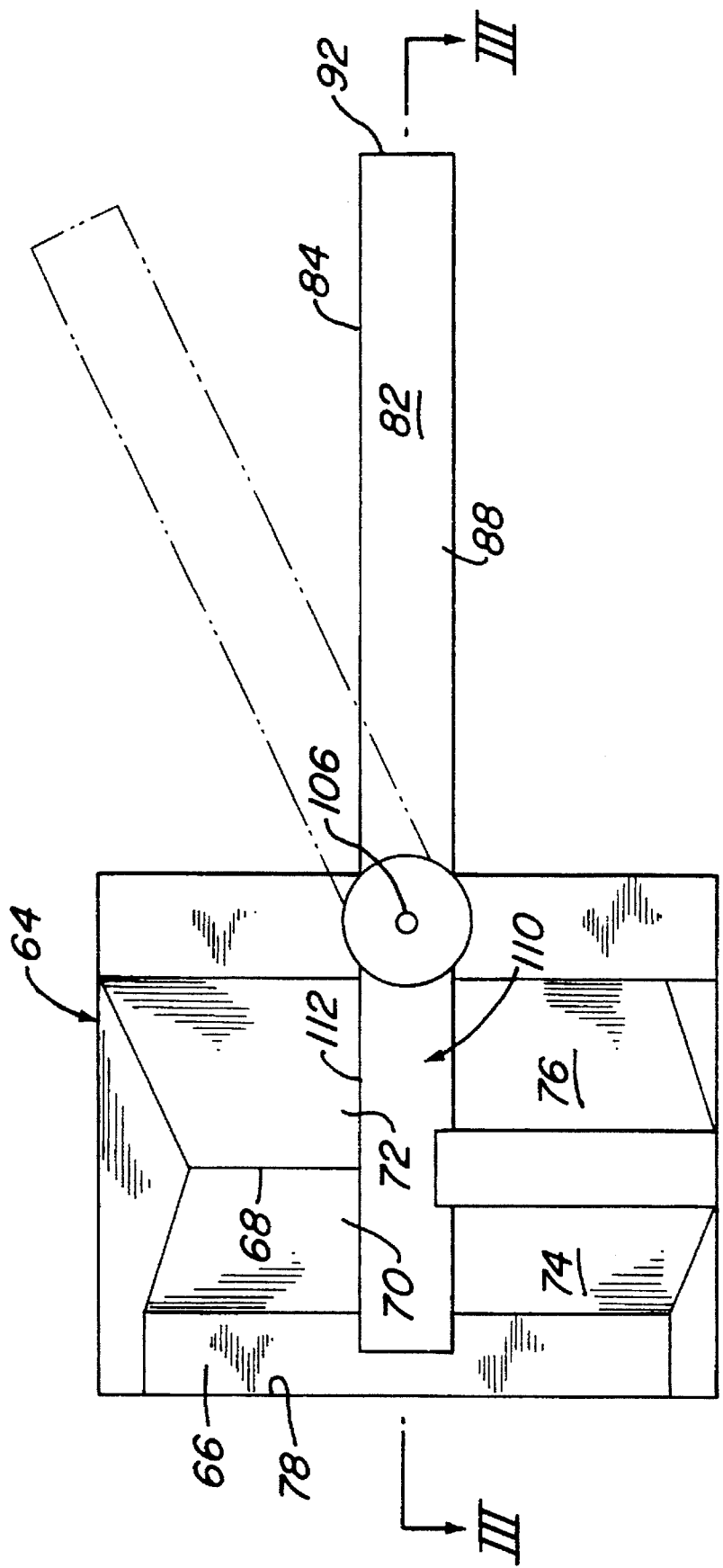
FIG. 2 is a top plan view of a grain bin and unloader means of the combine constructed in accordance with the invention.

The auger 62 is mounted above the grain bin 64 and is directed rearward, extending substantially midway over the grain bin 64, as shown in FIG. 2. The grain bin 64 is sized to accommodate a substantial volume of clean grain without effecting the operation of the combine 10. The grain bin 64 is open at its upper end and has a floor 66 at its lower end. The lower end of the grain bin 64 is divided by a partition 68 which extends parallel with longitudinal axis of the combine 10. The partition 68 is formed from a raised area of the floor 66 which has diverging sloped surfaces 70, 72 which are inclined downward from a center line of the partition 68 which is substantially parallel with the longitudinal axis of the combine 10. The partition 68 divides the lower portion of the grain bin 64 into left and right sumps or compartments 74, 76, as viewed in FIGS. 2 and 3. The sidewalls 78 of the grain bin 64 may also be sloped inwards to facilitate the flow of grain to the bottom of the compartments 74, 76.

Figure 3:
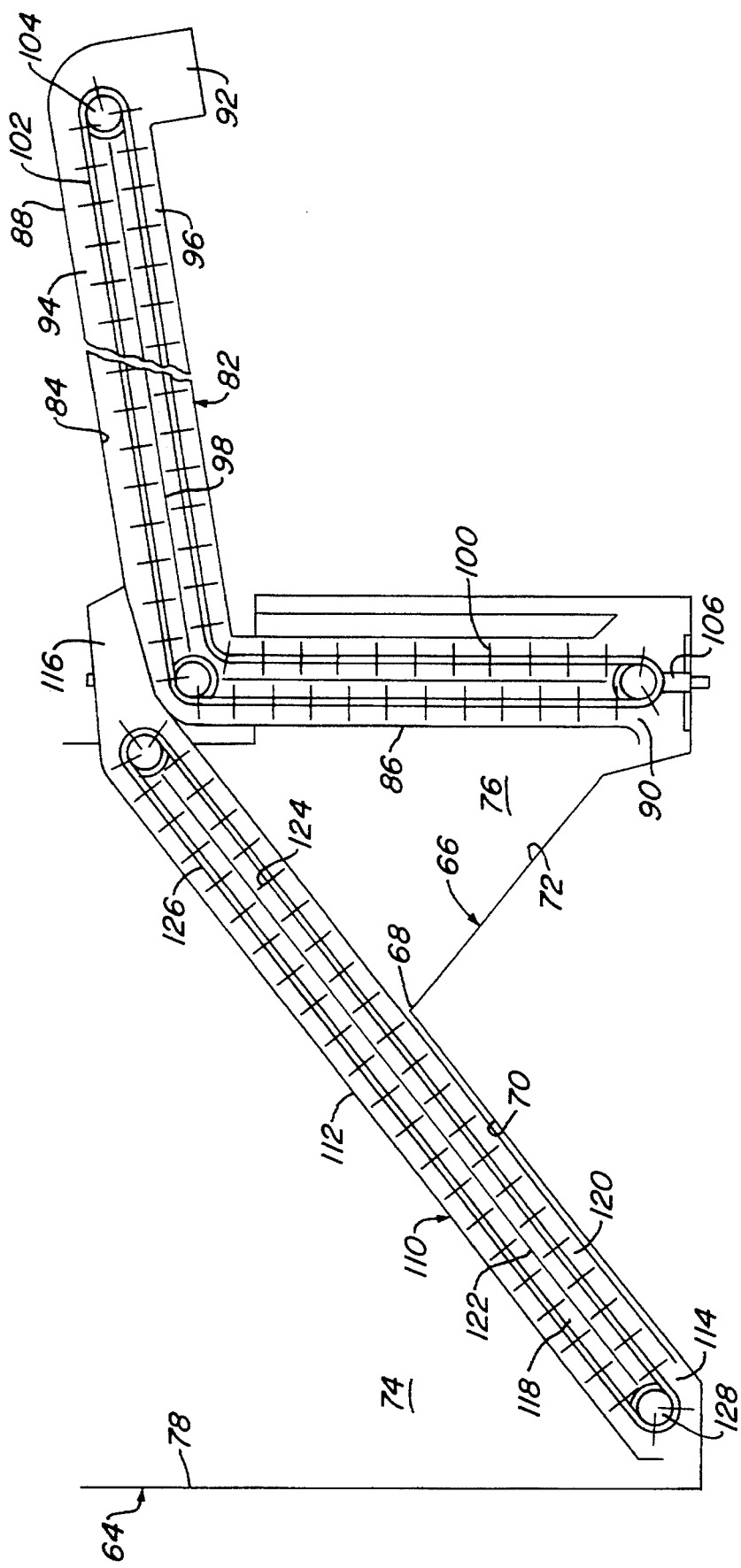
FIG. 3 is a front sectional view of the grain bin of FIG. 2 taken along the lines of 3—3.

Referring to FIG. 3, a discharge conveyor 82 is mounted to the grain bin 64 and supported by the frame 12 of the combine 10. The discharge conveyor 82 is formed from an L-shaped discharge conveyor housing 84 having a lower section 86 and an upper section 88. The lower section 86 of the discharge conveyor housing 84 is substantially vertical and extends into compartment 76 of the grain bin 64 terminating in a lower end having an opening or intake 90. The intake 90 should be located at the very bottom of the compartment 76 to facilitate complete removal of the grain within the compartment 76. At the opposite end of the conveyor housing 84, on the upper section 88, is a discharge 92 for discharging grain which is conveyed through the conveyor housing 84. As can be seen in FIGS. 1 and 3, the upper section 88 is substantially horizontal.

The discharge conveyor housing 84 is divided into a grain conveying compartment 94 and a paddle return compartment 96 which are formed from a partition 98 which extends substantially the entire length of the conveyor housing 84. Flat, rigid paddles 100 are provided in each of the compartments 94, 96. The paddles 100 are configured to conform to the interior of the compartments 94, 96 and are positioned generally perpendicular to the walls of the conveyor housing 84 and are spaced apart at intervals throughout the interior of the conveyor housing 84. Scoops or buckets could also be used in place of the paddles 100.

The paddles 100 are joined to a continuous flexible linkage 102 mounted around sprockets 104. The flexible linkage 102 is formed from a roller chain but may also be formed from other suitable means such as a drive belt mounted around rollers or pulleys which allow the belt to be continuously passed through the interior of the conveyor housing 84. The discharge conveyor 82 is mounted to the grain bin 64 by a vertical axle 106 which extends through the lower section 86 of the conveyor housing 84. This allows the discharge conveyor 82 to be pivoted, as shown in FIG. 2 by the dashed lines, between an inward position, in which the upper section 88 and discharge 92 of the discharge conveyor 82 are located adjacent to the grain bin 64, and an outward position where the discharge 92 is extended away from the grain bin 64 for discharging grain away from the combine 10.

An elongate, auxiliary conveyor 110 is provided with the grain bin 64 and is shown in FIGS. 2 and 3. The auxiliary conveyor 110 is formed from an auxiliary conveyor housing 112 having an inlet 114 located at its lower end and a grain outlet 116 located at its upper end. The auxiliary conveyor housing 112 is generally transverse to the longitudinal axis of the combine 10 and is sloped upward at an angle from its lower end, which locates within the compartment 74 of the grain bin 64, toward the upper end of the vertical section 86 of the discharge conveyor housing 84. The inlet 114 of the auxiliary conveyor 110 should be located as near as possible to the floor 66 of the grain bin 64 within compartment 74 to facilitate complete removal of grain locating within the compartment 74.

The auxiliary conveyor 110 is formed in a similar manner to the discharge conveyor 82. Longitudinal upper and lower compartments 118, 120 are formed in the auxiliary conveyor housing 112 by a longitudinal partition 122 which extends substantially the entire length of the housing 112. The lower compartment 120 is a paddle return compartment and the upper compartment 118 is a grain conveying compartment. A plurality of paddles 124, similar to the paddles 100 of the discharge conveyor 82, locate within the interior of the housing 112 within each compartment 118, 120. The paddles 124 are joined to a continuous flexible linkage 126 which is mounted around a series of sprockets 128 so that the paddles 124 are passed through the interior of the conveyor housing 112.

As shown in FIG. 3, the grain outlet 116 of the auxiliary conveyor 110 opens into the discharge conveyor 82, communicating with compartment 94 of the discharge conveyor housing 84. An opening is provided in the discharge conveyor housing 84 above the lower section 86 with the axle 106 passing through opening and through the upper end of the auxiliary conveyor housing 112. It should be noted, that the compartment 94 of the horizontal upper section 88 of the discharge conveyor housing 84 may have a larger capacity than the paddle return compartment 96. This is to accommodate the additional grain delivered to the discharge conveyor 82 from the auxiliary conveyor 110 during operation.

In operation, clean grain which is harvested by means of the header assembly 20 and threshing rotor 26 is collected from the sieve section 30 and delivered to the grain bin 64 by means of the conveyor 50 located at the forward end of the combine 10. The auger 62 directs the clean grain from the conveyor 50 into the grain bin 64. As the grain bin 64 fills with grain, the partition 68 separates the grain located in the lower portion of the grain bin 64 so that it is generally equally divided between the compartments 74, 76. Eventually, the level of grain within the grain bin 64 will exceed the level of the partition 68. As grain is continuously removed by means of the discharge and auxiliary conveyors 82, 110, the partition 68 directs the grain located above the partition 68 generally equally to each of the compartments 74, 76. It should be noted that the capacity of the discharge conveyor 82 is substantially greater than that of the auxiliary conveyor 110 in order to accommodate the increase in grain flow received from the auxiliary conveyor 110.

Initially, the upper section 88 of the discharge conveyor 82 is in the inward, stored position with the upper section 88 being substantially parallel with the longitudinal axis of the combine 10. To unload the grain from the grain bin 64, the upper section 88 is pivoted about the axle 106 to the extended position, as shown in FIG. 2 by the solid lines. The conveyors 82, 110 are both actuated by rotating the sprockets 104, 128 by suitable drive means (not shown) powered by the engine 16. As seen in FIG. 3, the flexible linkage 126 of the auxiliary conveyor 110 will rotate in a clockwise direction with the paddles 124 located within the lower compartment 120 moving in a downward direction towards the inlet 114 and the paddles 124 located in the upper compartment 118 moving in the upward direction. As this occurs, grain located within the compartment 74 of the grain bin 64 is forced into the upper compartment 118 of the conveyor housing 112 and carried towards the grain outlet 116 located at the upper end of the conveyor housing 112.

Simultaneously, the flexible linkage 102 of the discharge conveyor 82 is rotated around the sprockets 104 in a clockwise direction, as shown in FIG. 3, with the paddles 100 in the paddle return compartment 96 passing downwards past the intake 90 and upwards through the compartment 94 towards the outlet 116 of the auxiliary conveyor housing 112. As the paddles 100 move through the conveyor housing 84, grain located within the compartment 76 of the grain bin 64 is forced upwards through the compartment 94. With the paddles 100 continuously moving through the interior of the conveyor housing 84, grain discharged from the grain outlet 116 of the auxiliary conveyor 110 is directed by the paddles 100 through the upper section 88 and out the discharge 92 to a suitable collection area, such as an grain truck (not shown) located adjacent the combine 10.

As grain is continuously removed from the grain bin 64 by means of the auxiliary conveyor 110 and discharge conveyor 82, the partition 68 causes the grain to be directed into either of the two compartments 74, 76 as the level of grain within the grain bin 64 drops. The sloped surfaces 70, 72 of the partition 68 facilitate the flow of grain towards the inlet 114 of the auxiliary conveyor 110 and the intake 90 of the discharge conveyor 82. The sides 78 of the grain bin 64 may also be sloped to facilitate flow of grain towards the inlet 114 and intake 90. Once grain is unloaded from the grain bin 64, the drive means rotating the sprockets 104 on the discharge conveyor 82 and the sprockets 128 on the auxiliary conveyor 110 may be deactivated so that the movement of the paddles 100, 124 is halted. The discharge conveyor 82 may then be pivoted back to the inward position with the upper section 88 locating adjacent to the grain bin 64 of the combine 10 for storage. It should be noted that it is not necessary to completely unload grain from the grain bin 64 before the conveyors 82, 110 can be shut off. The conveyors 82, 110 can be stopped at any time without affecting their operation.

The grain storage unit of the combine has several advantages over the prior art. The capacity of the discharge conveyor is greatly improved by the use of the auxiliary conveyor so that grain is simultaneously removed from different locations within the grain bin. The use of paddles with the conveyors instead of a screw-type augers is more efficient, requires less energy and results in less damage to the grain.

While the invention is shown in only one of its forms, it should be apparent to those skilled in the art that it is not so limited, but is susceptible to various changes without departing from the scope of the invention.

We claim:

1. In an apparatus having a mobile frame, an improved storage means for storing grain comprising in combination:

a grain bin mounted to the frame, the grain bin having a lower portion with a partition dividing the lower portion of the grain bin into two compartments;

a discharge conveyor mounted to the frame having a generally vertical lower section and a generally horizontal upper section, the discharge conveyor having an intake on the lower section which is in communication with one of the two compartments, the discharge conveyor having a discharge end located on the horizontal upper section remote from the intake for discharging grain from the grain bin; and an auxiliary conveyor having an inlet in communication with the other of the two compartments and a grain outlet which opens into the upper section of the discharge conveyor for delivering grain from the other of the two compartments into the upper section of the discharge conveyor, the Upper section of the discharge conveyor transporting and discharging grain from said one of the two compartments and the auxiliary conveyor so that grain is unloaded from the grain bin.

2. The apparatus of claim 1, wherein:

the partition has sloped sides to facilitate the flow of grain in the two compartments toward the intake of the discharge conveyor and the inlet of the auxiliary conveyor.

3. The apparatus of claim 1, wherein:

the discharge conveyor is pivotally mounted to the frame of the apparatus so that the discharge end can be pivoted substantially about a vertical axis between an inward position adjacent to the frame of the apparatus and an outward position away from the frame of the apparatus.

4. In an apparatus having a mobile frame, an improved storage means for storing grain comprising in combination:

grain bin mounted to the frame, the grain bin having a lower portion with a partition dividing the lower portion of the grain bin into two compartments;

a discharge conveyor mounted to the frame, the discharge conveyor having an intake which is in communication with one of the two compartments, the discharge conveyor having a discharge end remote from the intake for discharging grain from the grain bin;

an auxiliary conveyor having an inlet in communication with the other of the two compartments and a grain outlet which opens into the discharge conveyor for delivering grain from the other of the two compartments into the discharge conveyor, the discharge conveyor discharging grain from said one of the two compartments and the auxiliary conveyor so that grain is unloaded from the grain bin; and wherein the discharge conveyor includes:

a conveyor housing having an interior and having a substantially upright lower section and a substantially horizontal upper section, the intake of the discharge conveyor being located on the lower section and the discharge end being located on the upper section, the discharge end having a discharge opening, the conveyor housing having an auxiliary opening located between the intake of the discharge conveyor and the discharge opening for receiving grain delivered from the auxiliary conveyor through the grain outlet;

a plurality of conveyor paddles spaced apart from each other at intervals and mounted within the conveyor housing; and drive means for moving the conveyor paddles through the conveyor housing so that the conveyor paddles move past the intake of the discharge conveyor and the auxiliary opening to the discharge opening, the paddles forcing grain received from the intake and the auxiliary opening to the discharge opening, carrying grain through the conveyor housing and discharging the grain through the discharge opening.

5. The apparatus of claim 4, wherein:

the drive means includes a continuous flexible linkage which is rotatably driven around at least one pulley, the conveyor paddles being joined to the flexible linkage so that the paddles are continually passed through the interior of the conveyor housing as the flexible linkage is driven around the at least one pulley.

6. In an apparatus having a mobile frame, an improved storage means for storing grain comprising in combination:

a grain bin mounted to the frame, the grain bin having a lower portion with a partition dividing the lower portion of the grain bin into two compartments;

a discharge conveyor mounted to the frame, the discharge conveyor having an intake which is in communication with one of the two compartments, the discharge conveyor having a discharge end remote from the intake for discharging grain from the grain bin;

an auxiliary conveyor having an inlet in communication with the other of the two compartments and a grain outlet which opens into the discharge conveyor for delivering grain from the other of the two compartments into the discharge conveyor, the discharge conveyor discharging grain from said one of the two compartments and the auxiliary conveyor so that grain is unloaded from the grain bin; and wherein the auxiliary conveyor includes:

a conveyor housing having an interior, the inlet of the auxiliary conveyor being located at one end of the conveyor housing, the grain outlet being located opposite the inlet;

a plurality of paddles spaced apart from each other at intervals and mounted within the conveyor housing; and drive means for moving the paddles through the conveyor housing so that the paddles move past the inlet to the grain outlet, the paddles forcing grain received from the inlet to the grain outlet so that grain is carried through the conveyor housing and delivered through the outlet to the discharge conveyor.

7. The apparatus of claim 6, wherein:

the drive means includes a continuous flexible linkage which is rotatably driven around at least one pulley, the paddles being joined to the flexible linkage so that the paddles are continually passed through the interior of the conveyor housing as the flexible linkage is driven around the at least one pulley.

8. In a combine for harvesting crop, the combine having a mobile frame, an improved storage unit for storing clean grain comprising in combination:

a grain bin mounted to the frame, the grain bin having a lower portion with a partition dividing the lower portion of the grain bin into two compartments;

a discharge conveyor mounted to the frame, the discharge conveyor including:

a discharge conveyor housing having an interior and an intake at one end which is in communication with one of the two compartments of the grain bin and having a discharge opening located at a free end of the discharge conveyor housing remote from the intake for discharging grain from the grain bin;

a plurality of discharge conveyor paddles spaced apart from each other at intervals and mounted within the discharge conveyor housing; and drive means for moving the discharge conveyor paddles through the interior of the discharge conveyor housing; and an auxiliary conveyor mounted to the frame of the combine, the auxiliary conveyor including:

an auxiliary conveyor housing having an interior and an inlet in communication with the other of the two compartments of the grain bin, the auxiliary conveyor housing having a grain outlet opposite the inlet which opens into the interior of the discharge conveyor housing for delivering grain from the other of the two compartments into the discharge conveyor;

a plurality of auxiliary conveyor paddles spaced apart from each other at intervals and mounted within the auxiliary conveyor housing; and drive means for moving the auxiliary paddles through the interior of the auxiliary conveyor housing so that the auxiliary conveyor paddles move past the inlet to the grain outlet, the paddles forcing grain received from the inlet to the grain outlet so that the grain is carried through the conveyor housing and delivered through the outlet to the interior of the discharge conveyor housing; and wherein the drive means of the discharge conveyor moves the discharge conveyor paddles past the intake of the discharge conveyor housing and the grain outlet of the auxiliary conveyor housing to the discharge opening, the paddles forcing grain received from the intake and the auxiliary conveyor through the discharge opening so that grain is unloaded from the grain bin.

9. The combine of claim 8, wherein:

the partition has sloped sides to facilitate the flow of grain in the two compartments toward the intake of the discharge conveyor and the inlet of the auxiliary conveyor.

10. The combine of claim 8, wherein:

the discharge conveyor is pivotally mounted to the frame of the combine so that the free end of the discharge conveyor housing can be pivoted about a vertical axis between an inward position adjacent to the frame of the combine and an outward position away from the frame of the combine.

11. The combine of claim 8, wherein:

the drive means of the discharge conveyor includes a continuous flexible linkage which is rotatably driven around at least one pulley, the discharge conveyor paddles being joined to the flexible linkage so that the discharge conveyor paddles are continually passed through the interior of the discharge conveyor housing as the flexible linkage is driven around the at least one pulley.

12. The combine of claim 8, wherein:

the drive means of the auxiliary conveyor includes a continuous flexible linkage which is rotatably driven around at least one pulley, the auxiliary conveyor paddles being joined to the flexible linkage so that the auxiliary conveyor paddles are continually passed through the interior of the auxiliary conveyor housing as the flexible linkage is driven around the at least one pulley.

13. The combine of claim 8, wherein:

the discharge conveyor housing has a substantially upright lower section and a substantially horizontal upper section, the intake of the discharge conveyor housing being located on the lower section and the discharge opening being located on the upper section.

14. A method of unloading grain from a storage bin of an apparatus having a mobile frame, the method comprising the steps of:

providing a grain bin mounted to the frame, the grain bin having a lower portion;

dividing the lower portion of the grain bin into two compartments;

mounting a discharge conveyor to the frame, the discharge conveyor having a generally vertical lower section and a generally horizontal upper section with an intake located on the lower section and a discharge end located on the upper section remote from the intake with the intake being in communication with one of the two compartments;

providing an auxiliary conveyor having an inlet in communication with the other of the two compartments, the auxiliary conveyor having a grain outlet which opens into the upper section of the discharge conveyor;

delivering grain from the other of the two compartments through the auxiliary conveyor into the upper section of the discharge conveyor; and transporting grain from said one of the two compartments and the auxiliary conveyor through the upper section of the discharge conveyor and discharging said grain out the discharge end so that grain is unloaded from the grain bin.

15. The method of claim 14, wherein:

the step of dividing the lower portion of the grain bin includes providing the lower portion with a partition having sloped sides to facilitate the flow of grain in the two compartments toward the intake of the discharge conveyor and the inlet of the auxiliary conveyor.

16. The method of claim 14, wherein:

the step of mounting a discharge conveyor pivotally mounting the discharge conveyor to the frame so that the discharge end can be pivoted about a vertical axis between an inward position adjacent to the frame of the apparatus and an outward position away from the frame of the apparatus; and the step of discharging grain through the discharge conveyor includes pivoting the discharge end of the discharge conveyor to the outward position so that grain can discharged away from the frame of the apparatus to a selected area.

* * * * *